(12) United States Patent  (10) Patent No.: US 7,326,287 B2
Patel                      (45) Date of Patent:    Feb. 5, 2008

(54) CYAN INKS AND THEIR USE IN INK-JET PRINTERS

(75) Inventor: Prakash Patel, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 226 days.

(21) Appl. No.: 10/564,960

(22) PCT Filed: Jul. 2, 2004

(86) PCT No.: PCT/GB2004/002864

§ 371 (c)(1),
(2), (4) Date: Jan. 18, 2006

(87) PCT Pub. No.: WO2005/014732

PCT Pub. Date: Feb. 17, 2005

(65) Prior Publication Data

US 2006/0201385 A1    Sep. 14, 2006

(30) Foreign Application Priority Data

Jul. 18, 2003  (GB) ................. 0316856.4

(51) Int. Cl.
  *C09D 11/02*  (2006.01)
  *C09B 47/04*  (2006.01)
  *B41J 2/01*   (2006.01)
(52) U.S. Cl. ............... 106/31.49; 540/133; 8/661; 347/100
(58) Field of Classification Search ........... 106/31.49; 540/132, 133; 8/638, 661; 347/100
   See application file for complete search history.

(56) References Cited

U.S. PATENT DOCUMENTS

| | | | |
|---|---|---|---|
| 2,285,359 A | 6/1942 | Rösch et al. ............ 260/214 |
| 2,300,572 A | 11/1942 | Hoyer et al. ........... 260/214 |
| 2,414,374 A | 1/1947 | Haddock et al. ....... 260/314.5 |
| 3,123,594 A | 3/1964 | Koller et al. ........... 534/701 |
| 3,365,463 A | 1/1968 | Groll et al. ............ 260/314.5 |
| 3,458,517 A | 7/1969 | Stepp .................... 540/121 |
| 3,622,263 A | 11/1971 | Groll et al. ............. 8/178 |
| 3,679,675 A | 7/1972 | von Tobel ............. 260/242 |
| 4,791,165 A | 12/1988 | Bearss et al. ........... 524/516 |
| 5,098,474 A | 3/1992 | Pawlowski et al. ....... 106/22 |
| 5,183,501 A | 2/1993 | Kawashita et al. ..... 106/22 D |
| 5,382,283 A | 1/1995 | Yui et al. ............. 106/22 R |
| 5,739,319 A | 4/1998 | Yamasaki ............. 540/140 |
| 5,879,439 A | 3/1999 | Nagai et al. ........... 106/31.28 |
| 5,993,524 A | 11/1999 | Nagai et al. ........... 106/31.27 |
| 6,190,422 B1* | 2/2001 | Carr ..................... 106/31.49 |
| 6,362,348 B1 | 3/2002 | Takahashi et al. ...... 549/315 |
| 6,379,441 B1 | 4/2002 | Kanaya et al. ......... 106/31.27 |
| 6,444,807 B1 | 9/2002 | Wolleb et al. .......... 540/131 |
| 6,569,212 B2* | 5/2003 | Carr ..................... 106/31.49 |
| 7,014,696 B2* | 3/2006 | Patel ..................... 106/31.49 |
| 7,022,171 B2* | 4/2006 | Patel et al. ............. 106/31.49 |
| 7,147,698 B2* | 12/2006 | Patel ..................... 106/31.49 |
| 7,156,908 B2* | 1/2007 | Patel ..................... 106/31.49 |
| 7,182,806 B2* | 2/2007 | Patel ..................... 106/31.49 |
| 7,189,283 B2* | 3/2007 | Patel ..................... 106/31.49 |
| 2003/0105321 A1 | 6/2003 | Wolleb et al. .......... 540/131 |
| 2003/0127019 A1* | 7/2003 | Adamic et al. ......... 106/31.49 |

(Continued)

FOREIGN PATENT DOCUMENTS

BE    536200    9/1955

(Continued)

OTHER PUBLICATIONS

Schofield et al., "Analysis of sulphonated phthalocyanine dyes by capillary electrophoresis", Journal of Chromatography, 770:345-348 (1997), no month.

(Continued)

*Primary Examiner*—Helene Klemanski
(74) *Attorney, Agent, or Firm*—Morgan, Lewis & Bockius LLP

(57) ABSTRACT

A composition comprising:
(a) a major dye component which is a mixture of copper phthalocyanine dyes of Formula (1):

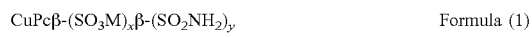

$$CuPc\beta\text{-}(SO_3M)_x\beta\text{-}(SO_2NH_2)_y \quad \text{Formula (1)}$$

wherein:
Pc represents a phthalocyanine nucleus of formula;

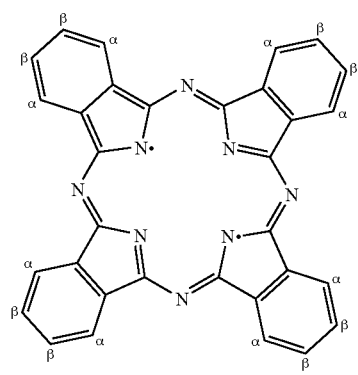

M is a cation;
x and y each independently have an average value of from 0.5 to 3.5;
(x+y)=4; and
the sulfo and sulfonamide substituents are attached to a β-position on the phthalocyanine ring; and
(b) a liquid medium which comprises water and an organic solvent or an organic solvent free from water. Also ink-jet printing processes, printed images, ink-jet printers and ink-jet cartridges.

15 Claims, No Drawings

U.S. PATENT DOCUMENTS

| | | | |
|---|---|---|---|
| 2003/0164114 A1* | 9/2003 | Kitayama et al. | 540/133 |
| 2003/0217671 A1 | 11/2003 | Ozawa | 106/31.49 |
| 2004/0045478 A1 | 3/2004 | Tateishi et al. | 106/31.49 |
| 2004/0099181 A1 | 5/2004 | Tateishi et al. | 106/31.47 |
| 2005/0073563 A1 | 4/2005 | Hanaki et al. | 347/100 |
| 2005/0076807 A1 | 4/2005 | Ogawa et al. | 106/31.49 |
| 2005/0081745 A1 | 4/2005 | Ogawa et al. | 106/31.27 |
| 2005/0215773 A1 | 9/2005 | Tateishi et al. | 534/653 |
| 2006/0162615 A1* | 7/2006 | Patel | 106/31.49 |
| 2006/0201384 A1* | 9/2006 | Patel | 106/31.46 |

FOREIGN PATENT DOCUMENTS

| | | |
|---|---|---|
| EP | 1 304 359 A1 | 4/2003 |
| EP | 1 473 335 A1 | 11/2004 |
| EP | 1 607 445 A1 | 12/2005 |
| EP | 1 609 824 A1 | 12/2005 |
| GB | 496663 | 12/1938 |
| GB | 704231 | 2/1954 |
| GB | 784843 | 10/1957 |
| GB | 921250 | 3/1963 |
| GB | 937182 | 9/1963 |
| GB | 1039379 | 8/1966 |
| JP | 53066938 | 6/1978 |
| JP | 62190273 | 8/1987 |

OTHER PUBLICATIONS

Color Index, p. 4619, No. 74220, C.I. Acid Blue 249, no date avail.

* cited by examiner

CYAN INKS AND THEIR USE IN INK-JET PRINTERS

This invention relates to inks, to printing processes, to printed substrates and to ink-jet printer cartridges.

Ink-jet printing is a non-impact printing technique in which droplets of ink are ejected through a fine nozzle onto a substrate without bringing the nozzle into contact with the substrate.

Colour ink-jet printers typically use four inks of differing hues: magenta, yellow, cyan, and black. Colours other than these may be obtained using differing combinations of these inks. Thus, for optimum print quality, the colourants used must be able to form an ink with a specific precise hue. This can be achieved by mixing colourants but is advantageously achieved by used a single colourant with the exact hue required.

With the advent of high-resolution digital cameras and ink-jet printers it is becoming increasingly common to print off photographs using an ink-jet printer. This avoids the expense of conventional silver halide photography and provides a print quickly and conveniently.

While ink-jet printers have many advantages over other forms of printing and image development there are still technical challenges to be addressed. For example, there are the contradictory requirements of providing ink-colorants which are soluble in the ink medium and yet do not run or smudge excessively when printed on paper. The inks need to dry quickly to avoid the printed sheets sticking together, but at the same time they should not form a crust over the tiny nozzle used in the printer. Storage stability is also important to avoid particle formation that could block the tiny nozzles used in the ink-jet printer. Furthermore, the resultant images desirably do not fade rapidly on exposure to light or common atmospheric oxidising gases such as ozone.

For a number of years C.I. Direct Blue 199 has been used as a colorant for cyan inks used in ink-jet printing. While this colorant has many properties that make it suitable for use in ink-jet printing key to the use of C.I. Direct Blue 199 is its hue, which enables it to give excellent cyan reproduction when printed. Thus, many ink-jet manufacturers have selected their yellow, magenta and black dyes so that can be advantageously mixed with C.I. Direct Blue 199 to give the full gamut of color.

However, prints of C.I. Direct Blue 199 tend to fade and change shade on long term exposure to light and trace oxidising gases present in the atmosphere, such as ozone. The problems of fading and shade change on contact with ozone are particularly acute when phthalocyanine colorants, such as C.I. Direct Blue 199, are printed onto media containing inorganic particles such as silica and/or alumina. There appears to be some aspect of the environment on the surface of such media (particularly media used for photorealistic ink-jet printing) which promotes deterioration of phthalocyanine dyes in the presence of ozone.

Thus, an ink-jet manufacturer is faced with the problem of how to improve the permanence of C.I. Direct Blue 199 without significantly altering its hue. If the hue of the cyan ink does significantly change then the ink-jet manufacturer will have to reformulate all the ink-jet inks in their ink-jet set to correct for this change.

C.I. Direct Blue 199 is copper phthalocyanine carrying sulfo and sulfonamide substituents. C.I. Direct Blue 199 is usually made by sulfonating copper phthalocyanine pigment, chlorinating the sulfonated phthalocyanine and then treating with ammonia to yield a polydisperse product which contains multiple species of phthalocyanines with differing levels of sulfo and sulfonamide substituents where the substituents are present in all susceptible positions on the phthalocyanine ring system.

We have surprisingly found that when C.I. Direct Blue 199 bears substituents only in the β-position of the phthalocyanine ring it yields prints with superior fade properties without significantly changing its hue.

Thus, the present invention provides a composition comprising:
(a) a major dye component which is a mixture of copper phthalocyanine dyes of Formula (1):

$$CuPc\beta\text{-}(SO_3M)_x\beta\text{-}(SO_2NH_2)_y \qquad \text{Formula (1)}$$

wherein:
Pc represents a phthalocyanine nucleus of formula;

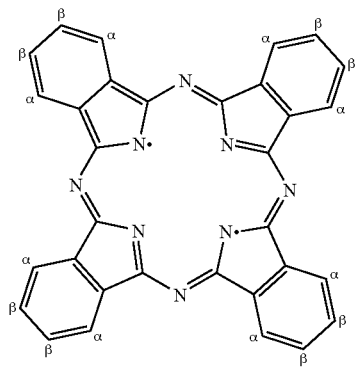

M is a cation;
x and y each independently have an average value of from 0.5 to 3.5;
(x+y)=4; and
the sulfo and sulfonamide substituents are attached to a β-position on the phthalocyanine ring; and
(b) a liquid medium which comprises water and an organic solvent or an organic solvent free from water.

The phthalocyanine nucleus may be represented by the bivalent radical of formula:

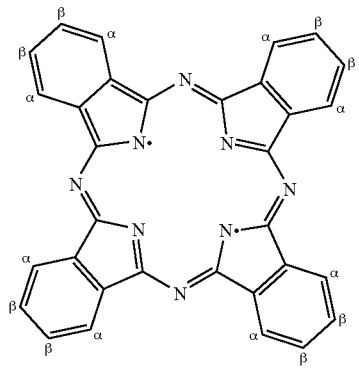

The copper phthalocyanine dyes of Formula (1) where the sulfo and sulfonamide substituents are attached to a β-position on the phthalocyanine ring may be prepared by any method known in the art, and particularly by cyclisation of β-sulfonated phthalic acid, phthalonitrile, iminoisoindoline, phthalic anhydride, phthalimide or phthalamide in the presence of a suitable nitrogen source (if required), a copper salt, such as CuCl$_2$, and a base such as 1,8-diazabicyclo[5.4.0]undec-7-ene (DBU) followed by chlorination and then amination.

Preferably copper phthalocyanine dyes of Formula (1) where the sulfo and sulfonamide substituents are attached to a β-position on the phthalocyanine ring are prepared by cyclisation of 4-sulfo-phthalic acid to phthalocyanine β-tetrasulfonic acid in the presence of a nitrogen source such as urea, a copper salt, such as CuCl$_2$ and a base such as 1,8-diazabicyclo[5.4.0]undec-7-ene (DBU) followed by chlorination and then amination.

The ratio of sulfo to sulfonamide substituents may be varied by varying the nature and amount of chlorinating agent used, the amount of ammonia added in the amination step and the reaction conditions in both reactions.

When phthalocyanine β-tetrasulfonic acid is an intermediate in a route to dyes of Formula (1) it may be chlorinated by reacting with any suitable chlorinating agent.

Chlorination may be carried out by treating the phthalocyanine β tetrasulfonic acid with chlorosulfonic acid preferably in the presence of an acid halide such as thionyl chloride, sulfuryl chloride, phosphorous pentachloride, phosphorous oxychloride or phosphorous trichloride.

The amount of ammonia required to form a dye of Formula (1) will depend to some extent on the composition of and amount of chlorosulfonating agent used. If a large excess of chlorosulfonating agent is used then more ammonia is needed. Thus, the amount of ammonia used is preferably sufficient to bring the pH of the product of the initial chlorination to a pH of 7 to 11, more preferably a pH of 8 to 10.

Preferably the condensation with ammonia to form a dye of Formula (1) is performed at a temperature of 0 to 50° C., more preferably 10 to 45° C. and especially 12 to 40° C.

The length of time for which the condensation with ammonia is performed will also depend on the temperature of the reaction. In a preferred embodiment the reaction with ammonia is performed at a temperature of 0 to 45° C. for a time of 0.5 to 24 hours.

A skilled person will appreciate that the product of these reactions will be a disperse mixture and so the values of x and y will represent an average of the groups present in the mixture.

The α-positions in the dyes of Formula (1) are unsubstituted, that is they bear a hydrogen substituent.

Preferably x has a value of 1 to 3.

Preferably y has a value of 1 to 3.

The cation represented by M is preferably an alkali metal salt, especially lithium, sodium and potassium, ammonium or a substituted ammonium salt (including a quaternary ammonium salt such as ((CH$_3$)$_4$N$^+$) or a mixture thereof. Especially preferred are salts with sodium, lithium, ammonia and volatile amines or mixtures thereof, more especially sodium salts.

When the preferred route, as set out above, is used to synthesise dyes of Formula (1) M is largely ammonium cations. However, any known techniques may be used to exchange the ammonium cation for another cation, for example acidification (e.g. using hydrochloric acid to give M=H), optionally followed by dialysis, to remove the original cations, with subsequent addition of alternative cations M (e.g. by addition of alkali metal hydroxide, ammonium salt or amine). Use of ion exchange resins and reverse osmosis are other techniques which can be used to exchange one cation for another.

The dyes described herein may exist in tautomeric forms other than those shown in this specification. These tautomers are also included within the scope of the present inventions.

When the liquid medium (b) comprises a mixture of water and organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include C$_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-C$_{1-4}$-alkyl ethers of diols, preferably mono-C$_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide and sulfolane. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-C$_{1-4}$-alkyl and C$_{1-4}$-alkyl ethers of diols, more preferably mono-C$_{1-4}$-alkyl ethers of diols having 2 to 12 carbon atoms, especially 2-methoxy-2-ethoxy-2-ethoxyethanol.

Examples of further suitable liquid media comprising a mixture of water and one or more organic solvents are described in U.S. Pat. Nos. 4,963,189, 4,703,113, 4,626,284 and EP 425150A.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbeforedescribed water-miscible organic solvents and mixtures thereof. Preferred water-immiscible solvents include, for example, aliphatic hydrocarbons; esters, preferably ethyl acetate; chlorinated hydrocarbons, preferably CH$_2$Cl$_2$; and ethers, preferably diethyl ether; and mixtures thereof.

When the liquid medium comprises a water-immiscible organic solvent then preferably a polar solvent is preferably included since this enhances solubility of the dyes of Formula (1) in the liquid medium. Examples of polar solvents include C$_{1-4}$-alcohols.

In view of the foregoing preferences it is especially preferred that where the liquid medium is an organic solvent free from water it comprises a ketone (especially methyl ethyl ketone) &/or an alcohol (especially a $C_{1-4}$-alkanol, more especially ethanol or propanol).

The organic solvent free from water may be a single organic solvent or a mixture of two or more organic solvents. It is preferred that when the liquid medium is an organic solvent free from water it is a mixture of 2 to 5 different organic solvents. This allows a liquid medium to be selected that gives good control over the drying characteristics and storage stability of the ink.

Liquid media comprising an organic solvent free from water are particularly useful where fast drying times are required and particularly when printing onto hydrophobic and non-absorbent substrates, for example plastics, metal and glass.

The liquid media may contain additional components conventionally used in ink-jet printing inks, for example viscosity and surface tension modifiers, corrosion inhibitors, biocides, kogation reducing additives and surfactants that may be ionic or non-ionic.

If the composition of the present invention contains phthalocyanine dyes other than those of Formula (1) then preferably at least 70% by weight, more preferably at least 80% by weight, especially at least 90% by weight, more especially at least 95% by weight and particularly at least 99% by weight of the total amount of phthalocyanine dye is of Formula (1) wherein the substituents, represented by x and y, are attached to a β position on the phthalocyanine ring.

Preferably the only phthalocyanine dye(s) present in the compositions of the present invention are of Formula (1).

Although not usually necessary, further colorants may be added to the ink to modify the shade and performance properties. Examples of such colorants include C.I. Direct Yellow 86, 132, 142 and 173; C.I. Direct Blue 307; C.I. Food Black 2; C.I. Direct Black 168 and 195; C.I. Acid Yellow 23; and any of the dyes used in ink-jet printers sold by Seiko Epson Corporation, Hewlett Packard Company, Canon Inc. & Lexmark International.

It is preferred that the composition according to the invention is an ink suitable for use in an ink-jet printer. An ink suitable for use in an ink-jet printer is an ink which is able to repeatedly fire through an ink-jet printing head without causing blockage of the fine nozzles.

An ink suitable for use in an ink-jet printer preferably has a viscosity of less than 20 cP, more preferably less than 10 cP, especially less than 5 cP, at 25° C.

An ink suitable for use in an ink-jet printer preferably contains less than 500 ppm, more preferably less than 250 ppm, especially less than 100 ppm, more especially less than 10 ppm in total of divalent and trivalent metal ions (other than any divalent and trivalent metal ions bound to a colorant of Formula (1) or any other component of the ink).

Preferably an ink suitable for use in an ink-jet printer has been filtered through a filter having a mean pore size below 10 μm, more preferably below 3 μm, especially below 2 μm, more especially below 1 μm. This filtration removes particulate matter that could otherwise block the fine nozzles found in many ink-jet printers.

Preferably an ink suitable for use in an ink-jet printer contains less than 500 ppm, more preferably less than 250 ppm, especially less than 100 ppm, more especially less than 10 ppm in total of halide ions.

Preferred compositions comprise:
(a) from 0.01 to 30 parts of dyes of Formula (1); and
(b) from 70 to 99.99 parts of a liquid medium which comprises a mixture of water and an organic solvent or an organic solvent free from water:
  wherein all parts are by weight.
  Preferably the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

Preferably component (a) is completely dissolved in component (b). Preferably component (a) has a solubility in component (b) at 20° C. of at least 10%. This allows the preparation of liquid dye concentrates that may be used to prepare more dilute inks and reduces the chance of the dye precipitating if evaporation of the liquid medium occurs during storage.

The inks may be incorporated in an ink-jet printer as a high concentration cyan ink, a low concentration cyan ink or both a high concentration and a low concentration ink. In the latter case this can lead to improvements in the resolution and quality of printed images. Thus the present invention also provides a composition (preferably an ink) where component (a) is present in an amount of 2.5 to 7 parts, more preferably 2.5 to 5 parts (a high concentration ink) or component (a) is present in an amount of 0.5 to 2.4 parts, more preferably 0.5 to 1.5 parts (a low concentration ink).

Compositions according to the present invention yield prints that display a good fastness to water and light. In particular, prints prepared using these inks display excellent light and ozone fastness.

A second aspect of the invention provides a process for forming an image on a substrate comprising applying an ink suitable for use in an ink-jet printer, according to the first aspect of the invention, thereto by means of an ink-jet printer.

The ink-jet printer preferably applies the ink to the substrate in the form of droplets that are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink-jet printers the oscillation of a small crystal causes ejection of the ink from the orifice. Alternately the ink can be ejected by an electromechanical actuator connected to a moveable paddle or plunger, for example as described in International Patent Application WO00/48938 and International Patent Application WO00/55089.

The substrate is preferably paper, plastic, a textile, metal or glass, more preferably paper, an overhead projector slide or a textile material, especially paper.

Preferred papers are plain or treated papers which may have an acid, alkaline or neutral character. Glossy papers are especially preferred.

A third aspect of the present invention provides a material preferably paper, plastic, a textile, metal or glass, more preferably paper, an overhead projector slide or a textile material, especially paper more especially plain, coated or treated papers printed with a composition according to the first aspect of the invention or by means of a process according to the second aspect of the invention.

It is especially preferred that the printed material of the third aspect of the invention is a photograph printed using an ink-jet printer.

A fourth aspect of the present invention provides an ink-jet printer cartridge comprising a chamber and an ink suitable for use in an ink-jet printer wherein the ink is in the chamber and the ink suitable for use in an ink-jet printer is as defined in the first aspect of the present invention. The cartridge may contain a high concentration ink and a low concentration ink, as described in the first aspect of the invention, in different chambers.

A fifth aspect of the present invention provides an ink-jet printer comprising a cartridge as defined in the fourth aspect of the present invention The invention is further illustrated by the following Examples in which all parts and percentages are by weight unless otherwise stated.

EXAMPLE 1

Step 1

Preparation of a Dye of Formula (1) where x is 2, 3 and y is 1.6:

Analysis of Dyes of Formula (1)

Confirmation of the structure of dyes of Formula (1) is by mass spec. Elemental analysis is used to determine the ratios of x to y. When the sum of x plus y is not exactly 4 this is due to the presence of small amounts of impurity. The presence of these impurities and their effect on the estimated values of x and y would be well known to a person skilled in the art who would appreciate that the value of x plus y will not exceed 4 and who would treat the experimentally determined values of x and y as indicative of the true ratios of the two groups.

Stage 1—Preparation of Copper Phthalocyanine Substituted with 4-SO₃H Groups in the β Position Potassium 4-sulfo-phthalic acid (56.8 g), urea (120 g), $CuCl_2$ (6.9 g), ammonium molybdate (1.2 g) and 1,8-diazabicyclo[5.4.0]undec-7-ene (DBU) (7.5 g) were mixed in a reaction vessel. The mixture was then warmed in stages (130° C./30 minutes, 150° C./30 minutes, 180° C./30 minutes, 220° C.) over 2 hours and the melt which formed was stirred at 220° C. for a further 2 hours. The solid that formed was extracted 4 times with hot water (4×200 ml) and the extract was filtered to remove insoluble material. The resultant filtrate was stirred at between 60° C.-70° C. and then sufficient NaCl was added to give a 7% salt solution. Stirring was continued and the solid that precipitated was filtered, washed with a 10% salt solution (200 ml) and pulled dry by vacuum. The resultant damp solid (77.6 g) was slurried in acetone, filtered and dried first at room temperature and then at 50° C.

Stage 2—Preparation of the Title Product

Stage 2(a) Preparation of Phthalocyanine Sulfonyl Chloride:

Phosphorous oxychloride (1.65 g) was added to chlorosulfonic acid (27.1 g) at 28° C. The sulfonated phthalocyanine product of stage 1 (9.8 g) was then added to this mixture over 10-15 minutes while keeping temperature below 60° C. This reaction mixture was stirred at 50° C. for 15-20 minutes and then slowly warmed to 120° C.-125° C. and kept at this temperature, with stirring for 3 hours. At the end of this time the reaction mixture was cooled and stirred at room temperature overnight. The next day the reaction-melt was added to a mixture of water/ice/salt/HCl (50 ml/150 g/10 g/2.5 ml), keeping the temperature below 0° C. using external cooling and further addition of ice as necessary. The resultant suspension was stirred at 0° C. for 30 minutes and then filtered, washed with an acidified ice cold 10% salt solution (100 ml) and pulled dry by vacuum to give 30 g of the product as a damp paste.

Stage 2(b) Amidation of Phthalocyanine Sulfonyl Chloride to Give the Title Product The phthalocyanine sulfonyl chloride paste from stage 2(a) was added portion-wise to a 150 ml of a cold aqueous solution of ammonium chloride (0.8 g) and stirred at 0° C. to 5° C. for 15-20 minutes. The pH of the mixture was slowly adjusted to 9.5 with 2 M NaOH solution and stirred at 0° C. to 5° C. for a further 30 minutes. The mixture was then left stirring overnight at room temperature. The next day the reaction mixture was warmed to 70° C. to 80° C. and stirred for 2 hours while maintaining the pH at pH 9.5 by the addition of 2M NaOH solution. The reaction mixture was then filtered and the filtrate (350 ml) was adjusted to pH 6-7 and NaCl was added in stages to give a 20% salt solution which was stirred at 60° C. The precipitated solid which formed was filtered, washed with a 20% salt solution and pulled dry by vacuum to give 23.5 g of a damp paste. This paste was re-dissolved in deionised water (150 ml) at pH 8.5 and dialysed to a low conductivity. The product was then filtered and dried at 50° C. to 60° C. to give a final yield of 7.5 g.

EXAMPLE 2

Preparation of the Title Product where x is 0.8 and y is 3.1

Stage 1

Stage 1 was carried out as in Example 1.

Stage 2(a) Preparation of Phthalocyanine Sulfonyl Chloride:

Concentrated sulfuric acid (0.6 ml, density 1.84) was added to chlorosulfonic acid (18.3 ml, 32.3 g) with stirring at room temperature. The sulfonated phthalocyanine product of stage 1 was added portion-wise to the acid mixture over 15 to 20 minutes. The resultant reaction mixture was stirred at 40° to 50° C. for 15-20 minutes and then 112° to 113° C. for 6 hours. The mixture was allowed to cool to room temperature overnight and then added to a mixture of water/salt/concHCl/ice (50 g/7.5 g/3 ml/120 g) while keeping the temperature below 0° C. using external cooling and further addition of ice as necessary. The resultant suspension was stirred at 0° C. for 30 minutes and then filtered, washed with an ice cold acidified 10% salt solution (50 ml) and pulled dry by vacuum to give the product as a damp paste.

Stage 2(b) Amidation of Phthalocyanine Sulfonyl Chloride to Give the Title Product The phthalocyanine sulfonyl chloride paste from stage 2(a) was added portion-wise to a mixture of water/ice/concentrated ammonia solution (90 ml/15 g/10 ml) and stirred at 0° C. to 5° C. for 15-20 minutes. The pH of the mixture was slowly adjusted to 9.5 with 2 M NaOH solution and stirred at 0° C. to 5° C. and a pH greater than 10 for 2 hours and then left stirring overnight at room temperature. The mixture was then heated up to room temperature and the reaction mixture was left stirring overnight. The next day the reaction mixture was heated to 40° C. and stirred at a pH greater than 9 for 2 hours. The temperature was then increased to 70°-72° C. and the mixture was stirred for a further 30 minutes. The pH of the mixture was adjusted to 1.0 with concentrated HCl and NaCl was added to give a 20% salt solution. The mixture was then stirred and the precipitate that formed was filtered, pulled dry by vacuum and dried at 50° C. to give 9.2 g of product.

Comparative Dye

The comparative dye was C.I. Direct Blue 199 obtained as Pro-jet™ Cyan 1 from Avecia Ltd, as supplied this is of Formula:

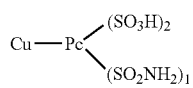

C.I. Direct Blue 199 is the most widely used cyan ink-jet dye and is made by sulfonation and amination of phthalocyanine pigment and comprises dye substituted in both the α and β positions.

EXAMPLE 3

Preparation of Ink 1 and the Comparative Ink

The dye of Example 1 and the dye of the Comparative Example were converted into inks by dissolving 3 g of dye in 100 ml of a liquid medium comprising:

| | | |
|---|---|---|
| Thiodiglycol | 5% | |
| 2-Pyrollidone | 5% | |
| Surfynol ™ 465 | 1% | |
| Water | 89% | (all % by weight) | and adjusting the pH of the ink to pH 8 with sodium hydroxide. An ink of this composition would be expected to have a viscosity of between 1 to 3 cp. Surfynol™ 465 is a surfactant from Air Products Ltd.

Ink-Jet Printing

Ink 1 and the Comparative Ink were filtered through a 0.45 micron nylon filters and then incorporated into empty print cartridges using a syringe.

The inks were then printed onto Epson Premium Glossy Photopaper ("SEC PM") and Canon PR101 Photopaper ("PR101").

The prints, at 100%, were tested for ozone fastness by exposure to 1 ppm ozone at 40° C., 50% relative humidity for 24 hrs in a Hampden 903 Ozone cabinet. Fastness of the printed ink to ozone was judged by the difference in the optical density before and after exposure to ozone.

Light-fastness of the printed image was assessed by fading the printed image in an Atlas Ci5000 Weatherometer for 100 hours and then measuring the change in the optical density.

Optical density measurements were performed using a Gretag spectrolino spectrophotometer set to the following parameters:

| | |
|---|---|
| Measuring Geometry | 0°/45° |
| Spectral Range | 400-700 nm |
| Spectral Interval | 20 nm |
| Illuminant | D65 |
| Observer | 2° (CIE 1931) |
| Density | Ansi A |
| External Filler | None |

Light and Ozone fastness are assessed by the percentage change in the optical density of the print, where a lower figure indicates higher fastness, and the degree of fade. The degree of fade is expressed as $\Delta E$ where a lower figure indicates higher light fastness. $\Delta E$ is defined as the overall change in the CIE colour co-ordinates L, a, b of the print and is expressed by the equation $\Delta E=(\Delta L^2+\Delta a^2+\Delta b^2)^{0.5}$. Results for light and ozone fastness are shown below.

| | Delta E PR101 | % OD Loss PR101 | Delta E SEC PM | % OD Loss SEC PM |
|---|---|---|---|---|
| Light Fastness | | | | |
| Ink 1 | 8 | −8 | 2 | −5 |
| Comparative Ink 1 | 21 | 30 | 4 | 9 |
| Ozone Fastness | | | | |
| Ink 1 | 2 | 0 | 4 | 0 |
| Comparative Ink 1 | 51 | 51 | 19 | 28 |

Clearly dyes according to the present invention display both enhanced ozone and light fastness compared to dyes substituted in both the α and β positions.

Further Inks

The inks described in Tables A and B may be prepared using the dyes made in Example 1 and 2. Numbers quoted in the second column onwards refer to the number of parts of the relevant ingredient and all parts are by weight. The inks may be applied to paper by thermal or piezo ink-jet printing.

The following abbreviations are used in Table A and B:

PG=propylene glycol

DEG=diethylene glycol

NMP=N-methyl pyrollidone

DMK=dimethylketone

IPA=isopropanol

MEOH=methanol

2P=2-pyrollidone

MIBK=methylisobutyl ketone

P12=propane-1,2-diol

BDL=butane-2,3-diol

CET=cetyl ammonium bromide

PHO=$Na_2HPO_4$ and

TBT=tertiary butanol

TDG=thiodiglycol

TABLE A
| Example | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 |  | 6 | 4 |  |  |  |  | 5 |  |
| 2 | 3.0 | 90 |  | 5 | 5 |  | 0.2 |  |  |  |  |  |
| 1 | 10.0 | 85 | 3 |  | 3 | 3 |  |  |  | 5 | 1 |  |
| 2 | 2.1 | 91 |  | 8 |  |  |  |  |  |  |  | 1 |
| 1 | 3.1 | 86 | 5 |  |  |  |  | 0.2 | 4 |  |  | 5 |
| 2 | 1.1 | 81 |  |  | 9 |  | 0.5 | 0.5 |  |  | 9 |  |
| 1 | 2.5 | 60 | 4 | 15 | 3 | 3 |  |  | 6 | 10 | 5 | 4 |
| 2 | 5 | 65 |  | 20 |  |  |  |  | 10 |  |  |  |
| 1 | 2.4 | 75 | 5 | 4 |  | 5 |  |  |  | 6 |  | 5 |
| 2 | 4.1 | 80 | 3 | 5 | 2 | 10 |  | 0.3 |  |  |  |  |
| 1 | 3.2 | 65 |  | 5 | 4 | 6 |  |  | 5 | 4 | 6 | 5 |
| 2 | 5.1 | 96 |  |  |  |  |  |  |  | 4 |  |  |
| 1 | 10.8 | 90 | 5 |  |  |  |  |  | 5 |  |  |  |
| 2 | 10.0 | 80 | 2 | 6 | 2 | 5 |  |  | 1 |  | 4 |  |
| 1 | 1.8 | 80 |  | 5 |  |  |  |  |  |  | 15 |  |
| 2 | 2.6 | 84 |  |  | 11 |  |  |  |  |  | 5 |  |
| 1 | 3.3 | 80 | 2 |  |  | 10 |  |  |  | 2 |  | 6 |
| 2 | 12.0 | 90 |  |  | 7 |  | 0.3 |  | 3 |  |  |  |
| 1 | 5.4 | 69 | 2 | 20 | 2 | 1 |  |  |  |  | 3 | 3 |
| 2 | 6.0 | 91 |  |  | 4 |  |  |  |  |  | 5 |  |
TABLE B
| Example | Dye Content | Water | PG | DEG | NMP | CET | TBT | TDG | BDL | PHO | 2P | PI2 |
|---|---|---|---|---|---|---|---|---|---|---|---|---|
| 1 | 3.0 | 80 | 15 |  |  | 0.2 |  |  |  |  | 5 |  |
| 2 | 9.0 | 90 |  | 5 |  |  |  |  |  | 1.2 |  | 5 |
| 1 | 1.5 | 85 | 5 | 5 |  | 0.15 | 5.0 | 0.2 |  |  |  |  |
| 2 | 2.5 | 90 |  | 6 | 4 |  |  |  |  | 0.12 |  |  |
| 1 | 3.1 | 82 | 4 | 8 |  | 0.3 |  |  |  |  |  | 6 |
| 2 | 0.9 | 85 |  | 10 |  |  |  |  | 5 | 0.2 |  |  |
| 1 | 8.0 | 90 |  | 5 | 5 |  |  | 0.3 |  |  |  |  |
| 2 | 4.0 | 70 |  | 10 | 4 |  |  |  | 1 |  | 4 | 11 |
| 1 | 2.2 | 75 | 4 | 10 | 3 |  |  |  | 2 |  | 6 |  |
| 2 | 10.0 | 91 |  |  | 6 |  |  |  |  |  | 3 |  |
| 1 | 9.0 | 76 |  | 9 | 7 |  | 3.0 |  |  | 0.95 | 5 |  |
| 2 | 5.0 | 78 | 5 | 11 |  |  |  |  |  |  | 6 |  |
| 1 | 5.4 | 86 |  |  | 7 |  |  |  |  |  | 7 |  |
| 2 | 2.1 | 70 | 5 | 5 | 5 | 0.1 | 0.2 | 0.1 | 5 | 0.1 | 5 |  |
| 1 | 2.0 | 90 |  | 10 |  |  |  |  |  |  |  |  |
| 2 | 2 | 88 |  |  |  |  |  | 10 |  |  |  |  |
| 1 | 5 | 78 |  |  | 5 |  |  | 12 |  |  | 5 |  |
| 2 | 8 | 70 | 2 |  | 8 |  |  | 15 |  |  | 5 |  |
| 1 | 10 | 80 |  |  |  |  |  | 8 |  |  | 12 |  |
| 2 | 10 | 80 |  | 10 |  |  |  |  |  |  |  |  |
The invention claimed is:
1. A composition comprising:
(a) a major dye component which is a mixture of copper phthalocyanine dyes of Formula (1):
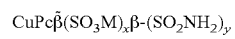  Formula (1)
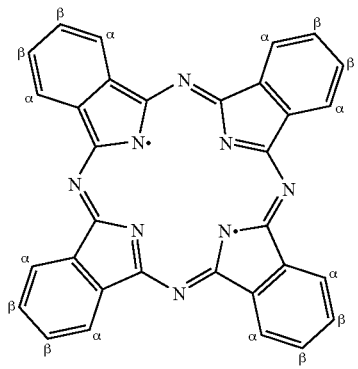
wherein:
Pc represents a phthalocyanine nucleus of formula;

M is a cation;

x and y each independently have an average value of from 0.5 to 3.5;

(x+y)=4; and the sulfo and sulfonamide substituents are attached to a β-position on the phthalocyanine ring; and (b) a liquid medium which comprises water and an organic solvent or an organic solvent free from water.

2. A composition according to claim 1 wherein the copper phthalocyanine dyes of Formula (1) are prepared by cyclisation of 4-sulfo-phthalic acid to phthalocyanine β-tetrasulfonic acid in the presence of a nitrogen source, a copper salt and a base followed by chlorination and then amination.

3. A composition according to either claim 1 or claim 2 where in the copper phthalocyanine dyes of Formula (1) x is 1 to 3.

4. A composition according to claim 1 where in the copper phthalocyanine dyes of Formula (1) y is 1 to 3.

5. A composition according to claim 1 where M is sodium, lithium, ammonia and volatile amines or mixtures thereof.

6. A composition according to claim 1 which comprises:

(a) from 0.01 to 30 parts of dyes of Formula (1); and (b) from 70 to 99.99 parts of a liquid medium which comprises a mixture of water and an organic solvent or an organic solvent free from water:

wherein all parts are by weight.

7. A composition according to claim 1 wherein at least 70% by weight of the total amount of phthalocyanine dye in said composition is of Formula (1).

8. A composition according to claim 1 wherein at least 90% by weight of the total amount of phthalocyanine dye in said composition is of Formula (1).

9. A composition according to claim 1 which is an ink suitable for use in an ink-jet printer.

10. A process for forming an image on a substrate comprising applying an ink according to claim 9 thereto by means of an ink-jet printer.

11. A material printed with a composition according to claim 1.

12. A material according to claim 11 that is a photograph printed utilizing an ink-jet printer.

13. An ink-jet printer cartridge comprising a chamber and an ink wherein the ink is in the chamber and the ink is as defined in claim 9.

14. An ink-jet printer comprising a cartridge as defined in claim 13.

15. A material printed with an ink-jet printer according to claim 10.

* * * * *